United States Patent [19]

Kelm et al.

[11] Patent Number: 4,628,694

[45] Date of Patent: Dec. 16, 1986

[54] FABRICATED LINER ARTICLE AND METHOD

[75] Inventors: James S. Kelm, Milford; Arthur L. Ludwig; Harvey M. Maclin, both of Cincinnati; Steven K. Roggenkamp; Thomas G. Wakeman, both of West Chester, all of Ohio

[73] Assignee: General Electric Company, Cincinnati, Ohio

[21] Appl. No.: 562,959

[22] Filed: Dec. 19, 1983

[51] Int. Cl.$^4$ .................. F02C 7/00

[52] U.S. Cl. .................. 60/752; 60/759

[58] Field of Search .................. 60/39.36, 39.37, 752, 60/755, 756, 757, 758, 759, 760

[56] References Cited

U.S. PATENT DOCUMENTS

| | | | |
|---|---|---|---|
| 1,707,347 | 4/1929 | Dunbar . | |
| 2,672,728 | 3/1954 | Stockdale | 60/757 |
| 2,720,080 | 10/1955 | Oulianoff et al. | 60/39.36 |
| 3,038,309 | 6/1962 | Waters | 60/39.66 |
| 3,352,649 | 11/1967 | Tennison, Jr. | 29/190 |
| 3,589,128 | 6/1971 | Sweet | 60/759 |
| 3,603,082 | 9/1971 | Sneeden | 60/39.36 |
| 3,793,827 | 2/1974 | Ekstedt | 60/759 |
| 3,872,664 | 3/1975 | Lohmann et al. | 60/759 |
| 3,990,837 | 11/1976 | Snell | 431/352 |
| 4,050,241 | 9/1977 | DuBell | 60/39.66 |
| 4,077,205 | 3/1978 | Pane et al. | 60/39.32 |
| 4,104,874 | 8/1978 | Carvel et al. | 60/759 |
| 4,236,378 | 12/1980 | Vogt | 60/757 |
| 4,253,301 | 3/1981 | Vogt | 60/39.46 |
| 4,262,464 | 4/1981 | Ludowici | 52/510 |

FOREIGN PATENT DOCUMENTS

| | | |
|---|---|---|
| 665155 | 1/1952 | United Kingdom . |
| 858525 | 1/1961 | United Kingdom . |

*Primary Examiner*—Louis J. Casaregola
*Attorney, Agent, or Firm*—Douglas S. Foote; Derek P. Lawrence

[57] ABSTRACT

A method of fabricating sheet metal panels and the article produced thereby. According to one form, the method of fabrication includes the steps of providing a panel of sheet metal, perforating the panel to provide a plurality of holes, forming the panel into a preselected curve about a longitudinal centerline, forming the leading edge portion of the panel into a front flange, forming a shoulder in the panel centered on the holes and extending perpendicularly from a surface thereof, bending an outer portion of the shoulder into a lip, and bonding the portions of the panel comprising the shoulder and lip.

7 Claims, 5 Drawing Figures

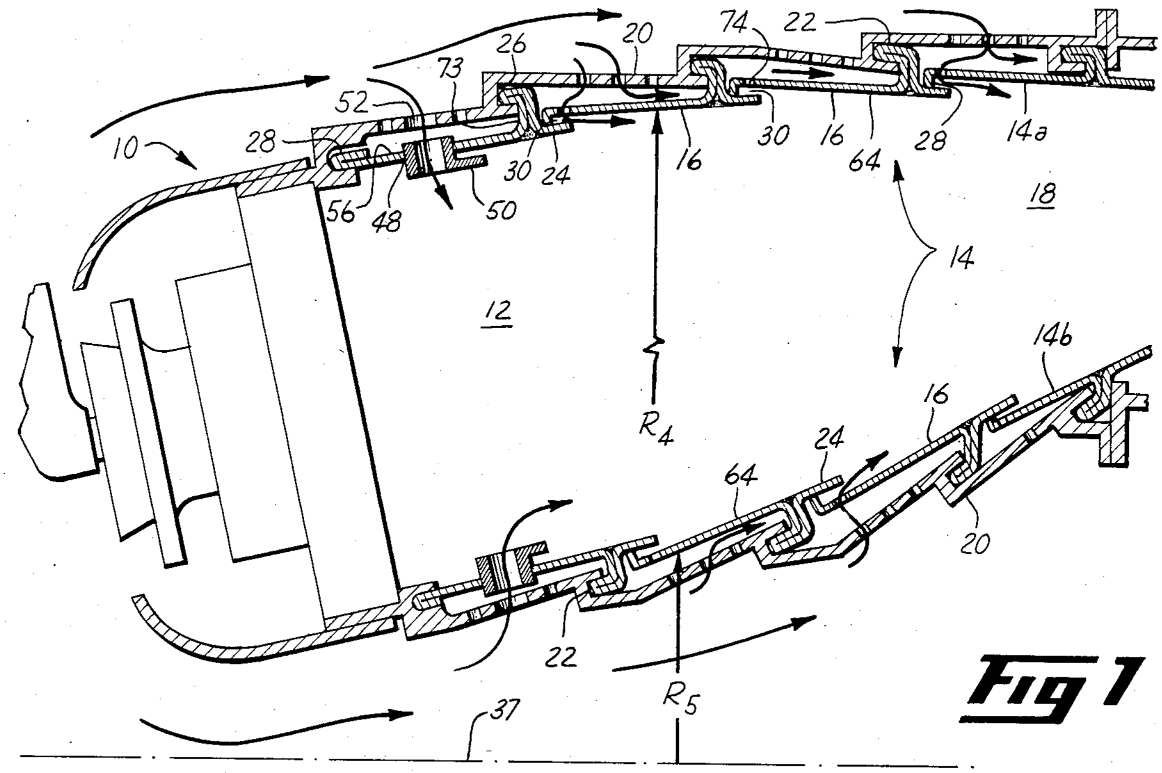
Fig 1
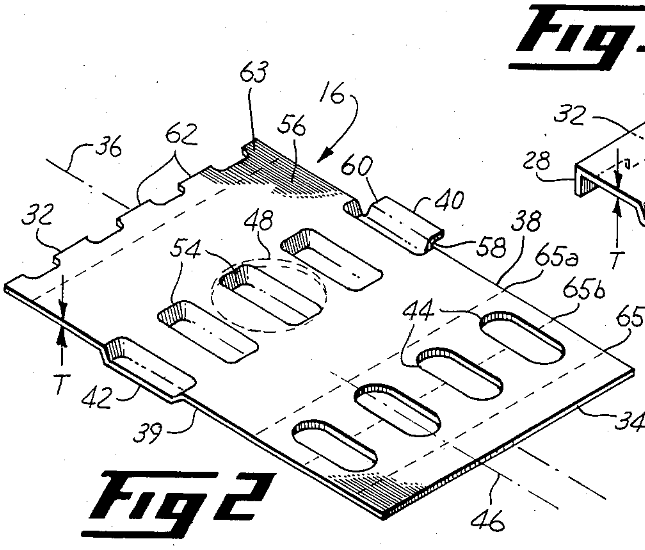
Fig 2
Fig 3
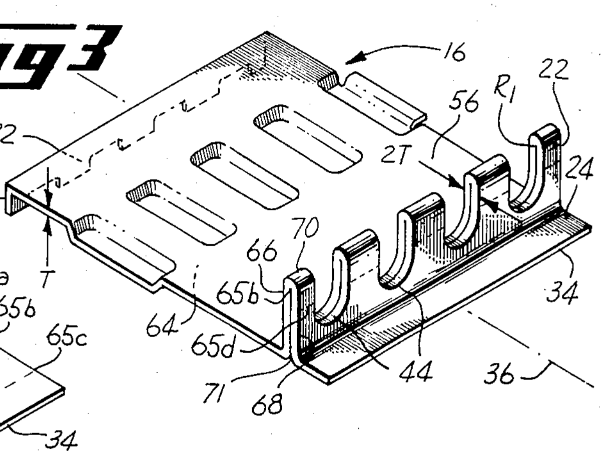
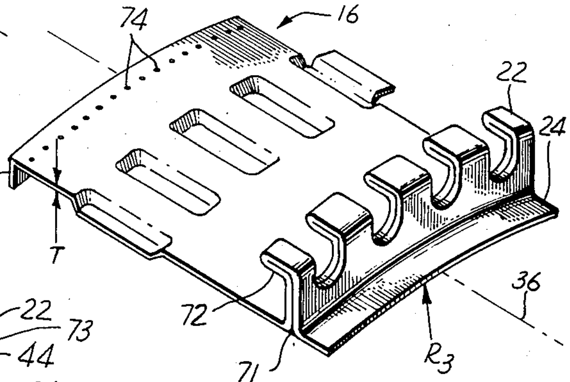
Fig 5
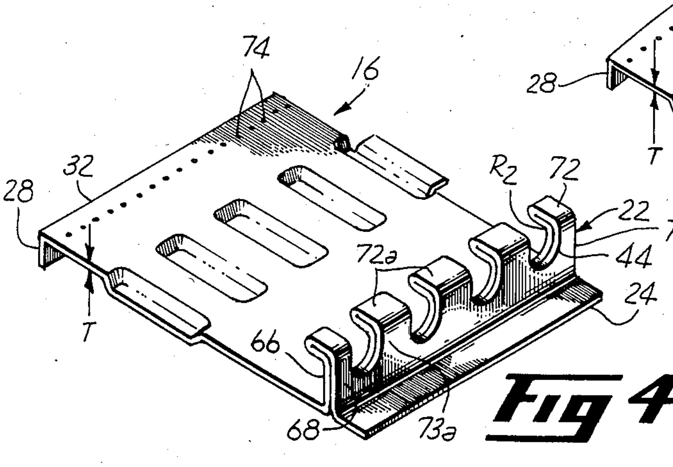
Fig 4

FABRICATED LINER ARTICLE AND METHOD

The Government has rights in this invention pursuant to Contract F33615-80-C-2027 awarded by the Department of the Air Force.

This invention relates to methods of fabrication and particularly to a new and improved method of fabricating a sheet metal panel for a liner, such as a combustor liner, and the article produced thereby.

BACKGROUND OF THE INVENTION

The liner in the combustor of a gas turbine engine is subject to a severe thermal environment. The maximum combustion temperature to which the liner can be subjected before it experiences a structural failure, such as by buckling or cracking, imposes an operational limitation upon the engine. Additionally, damage to a portion of a conventional continuous liner requires replacement of the entire liner.

An improved combustor liner arrangement has been developed to reduce structural failures and to facilitate replacement of only a damaged portion of a liner rather than the entire liner. The new arrangement comprises a plurality of liner panels disposed axially and circumferentially adjacently to each other and slidably mounted on a structural frame. Such a liner arrangement is disclosed in U.S. Pat. No. 4,253,301—Vogt, filed Oct. 13, 1978, and assigned to the same assignee as the present invention.

The panels of a liner can be fabricated by numerous methods. However, due to the complex shape of each panel, a suitable, commonly used method of fabrication comprises casting the panels.

Although casting the panels is an acceptable method of fabrication, it results in certain limitations. For example, under current casing technology, the thinnest portions of the cast panel have a minimum thickness, generally larger than required for adequate structural strength. The minimum castable thickness adds unnecessary weight to the panel and increases the weight of the combustor and the engine. Furthermore, the additional cast material required to obtain the minimum thickness adds to the cost of the panel.

Another limitation of casting the liner panels is cost. The casing machinery employed and time required to subsequently machine the panels can be relatively expensive, thus increasing the overall cost of an engine.

It is therefore an object of the present invention to provide a new and improved method of fabricating sheet metal panels.

Another object of the present invention is to provide a new and improved method of fabricating panels in which the amount of material required for the panel is less than that required using a casting method and thus the weight of the panels is reduced.

Another object of the present invention is to provide a new and improved method of fabricating panels in which the fabrication time and complexity are reduced.

Another object of the present invention is to provide a new and improved fabricated panel article.

SUMMARY OF THE INVENTION

The present invention comprises a method of fabricating a sheet metal panel and the article produced thereby. In accordance with one form, the method of fabrication includes the steps of providing a panel of sheet metal, perforating the panel to provide a plurality of holes, forming a shoulder in the panel centered on the holes to extend substantially perpendicularly from a surface thereof, and bending the outer portion of the shoulder into a lip.

Additional steps can include forming the panel into a preselected curve about a longitudinal centerline thereof, forming the leading edge portion of the panel into a front flange, and bonding the portions of the panel comprising the shoulder and the lip.

Furthermore, the method can also include providing a plurality of cooling holes through the panel adjacent to the front flange and dimpling the panel to provide a plurality of depressions therein in order to increase the resistance of the panel to bending in a selected direction.

BRIEF DESCRIPTION OF THE DRAWING

The invention will be better understood from the following description taken in conjunction with the accompanying drawing, wherein:

FIG. 1 is a cross-sectional view of an annular combustor of an axial flow gas turbine engine incorporating sheet metal panels fabricated according to one form of the method of the present invention.

FIG. 2 is an isometric view of a panel after it has been removed from sheet metal and showing holes and depressions having been perforated and dimpled therein, respectively.

FIG. 3 is an isometric view of the panel of FIG. 2 showing a forward flange and an intermediate form of a shoulder formed therein.

FIG. 4 is an isometric view of the panel of FIG. 3 showing a lip bent from the shoulder and cooling holes formed in a leading edge thereof.

FIG. 5 is an isometric view of the panel of FIG. 4 curved about a longitudinal centerline and in finished form.

DETAILED DESCRIPTION

Turning now to a consideration of the drawing and in particular to FIG. 1, there is shown an annular combustor 10 such as for use in an axial-flow gas turbine engine. The combustor 10 includes a combustion zone 12 generally defined as that region bound by liners 14: an annular, radially outer liner **14*a* and an annular, radially inner liner 14*b*. The outer liner 14*a* and the inner liner 14*b* each comprises a plurality of axially adjacent and overlapping annular rows. Each row comprises a plurality of circumferentially adjacent and overlapping combustor liner panels or plate members 16**.

Fuel and air are burned within the combustion zone 12 of the combustor 10 and hot expanding gases produced thereby exit the combustor through an outlet 18 and flow across the blades of a turbine rotor (not shown) causing the rotor to rotate and thereby performing work.

The liners 14 encasing the combustion zone 12 must be able to withstand the high temperatures produced during combustion. One type of liner which is capable of withstanding such high temperatures is that shown in FIG. 1 and comprises a plurality of combustor liner panels, such as the panels 16, mounted on a structural frame 20 within an outer casing (not shown). Each of the panels 16 includes a generally L-shaped, aft shoulder 22 located just forwardly of an aft flange 24 located at the trailing edge thereof. The aft shoulder 22 is received and suitably retained in a correspondingly shaped slot 26 disposed in the structural frame 20, which slot 26 thereby supports the aft end of the panel 16. A supporting, front flange 28 of each panel 16 mounts in a groove 30 defined between the structural frame 20 and the aft flange 24 of another panel 16 disposed adjacently upstream therefrom.

Although an annular combustor is shown in FIG. 1, it is to be understood that the panels fabricated according to the method of the present invention can be employed in other types of combustors such as can or can-annular combustors, as well as in non-combustor applications wherein a similar liner arrangement can be utilized.

An example of the above-described liner arrangement is disclosed in more detail in U.S. Pat. No. 4,253,301—Vogt, filed Oct. 13, 1978, and assigned to the same assignee as the present invention.

The present invention comprises a method of fabricating the panel 16 from sheet metal and the article produced thereby. Sheet metal can be typically thinner than the minimum thickness of a cast panel and therefore the weight of a sheet metal panel can be less than the weight of a cast panel.

Broadly construed, the method of fabrication of the panel 16 comprises the steps of stamping and bending a sheet metal blank or plate member into a fabricated article. Stamping is intended to include, either singly or in combination, the operations of cutting the blank to a desired form; providing holes and notches therein; and providing indentations or dimples thereon. Bending is intended to include, either singly or in combination, the operations of bending; successively bending; and bending of the sheet metal blank for forming flanges, shoulders and any curvature therein.

It is to be appreciated that the above-described steps are not intended to be limiting but may include any additional steps if desired, and the steps can be performed singly in various sequences or combined into as few operations as desired. However specifically accomplished, the method includes at least the forming of holes in the panel 16 and bending of the panel 16 for forming a shoulder therein. One sequence of steps in the method of fabricating the panel 16 is described below. Alternative forms of the method will become apparent from the teachings herein.

Turning now to FIG. 2, a first step in the fabrication of the sheet metal panels 16 comprises providing, such as by purchasing, or punching with a punch press or by any other appropriate method of cutting, stamping or machining, a generally rectangular panel or plate member 16 of sheet metal.

The panel 16 includes a leading edge 32 and an opposing trailing edge 34, each aligned substantially perpendicularly to an axial or longitudinal centerline 36 extending therebetween. When installed in the combustor 10, the panel 16 is aligned so that the longitudinal centerline 36 is aligned in a direction generally parallel to a longitudinal axis 37 of the combustor 10, shown in FIG. 1. As shown in FIG. 2, the panel 16 also preferably includes two opposing side edges 38 and 39 aligned substantially parallel to the longitudinal centerline 36. At least one of the side edges 38 and 39 and preferably both side edges of the panel 16 include first and second side flanges 40 and 42, respectively. The side flanges 40 and 42 can extend substantially the full length of the completed liner, if desired.

A second step in the method of fabrication comprises perforating the panel 16 to provide a plurality of holes 44, the plurality of holes being aligned substantially parallel to and spaced from the trailing edge 34 thereof. Although the holes 44 can be of any desired shape, it is preferable, in order to reduce weight yet retain structural integrity, that the holes 44 are elongated, that is, with straight sides and curved ends. A major axis 46 of each of the elongated holes is preferably aligned parallel to the longitudinal centerline 36.

It may be desirable that the combustor 10 include means for diluting the mixture of gases in the combustion zone 12. As can be seen in FIG. 1, such dilution means can comprise a plurality of dilution holes 48 disposed in a plurality of the panels 16 circumferentially spaced around the combustor 10 at a forward end thereof. Secured to these panels 16 and extending through the dilution holes 48 are tubular dilution eyelets 50 having downstream extending lips integral with radially inner ends thereof. Some of the panels 16 can thus include dilution holes 48 therein and eyelets 50 attached thereto which are aligned with appropriately sized holes 52 through the structural frame 20, for thereby permitting relatively large amounts of dilution and cooling air (as indicated by the flow arrows in FIG. 1 and supplied from a compressor, not shown) to flow into the combustor 10.

In order to provide the dilution holes 48, the method of fabrication can include a third step of perforating a generally circular dilution hole 48 through the panel 16 near the center thereof (as shown in phantom in FIG. 2).

Further illustrated in FIG. 2, the fabrication preferably includes a fourth step comprising dimpling, or indenting, the panel 16 in order to provide a plurality of corrugations or depressions 54, in a first surface 56 of the panel, elongated in a direction substantially parallel to the longitudinal centerline 36. The depressions 54 reinforce the panel 16 to resist bending across the longitudinal centerline 36 and yet add no weight to the panel. The number of depressions 54 as well as the number of holes 44 shown in FIG. 2 are for example only and can be varied as desired.

A fifth step of the fabrication may comprise the bending of the first side flange 40 into an L-shaped member having two legs, as can be seen in FIG. 2. A first leg 58 extends substantially perpendicularly from the first surface 56 of the panel 16 and a second leg 60 extends substantially perpendicularly from the first leg 58 and away from the panel 16. The first side flange 40 is effective for overlapping a second side flange 42 on an adjacent panel 16 when two panels 16 are mounted circumferentially adjacently to each other so as to define a seal between the two panels. The second side flange 42 may, for example, simply comprise an indentation in the first surface 56 of panel 16 for receiving the first side flange 40 of an adjacent panel 16.

As can be seen in FIG. 2, the method of fabrication may include a sixth step of notching the leading edge 32 of the panel 16 and thereby forming a plurality of scallops 62. As will be described hereinafter, the scalloped portion of the panel will be formed into the front flange 28 (as shown in FIG. 3). The scalloping not only reduces the weight of the panel but also, when a plurality of panels are suitably connected, allows cooling air to flow around the scallops 62 to cool a portion of an adjacent panel 16, such as the aft flange 24, upon which the front flange 38 rests (as shown in FIG. 1). A panel 16 may include both the scallops 62 and the dilution hole 48, or only one of these features or neither one.

A seventh step in the method of fabrication results in the structure shown in FIG. 3 and comprises forming the section 63 of the panel 16 adjacent to the leading edge 32 into the front flange 28. Shown in FIG. 3 is an embodiment comprising a simple 90° bend of the panel 16 near the leading edge 32 thereof. Preferably, the front flange 28 extends perpendicularly from a second surface 64 of the panel 16, which second surface 64 faces oppositely to the first surface 56. Alternatively, the front flange 28 can be further bent or folded over into the U-shaped structure as shown in the forward row of panels 16 in FIG. 1 and thereby defines a curved shape, such as for example a generally semicircular-shape, opening toward the trailing edge 34 of the panel 16.

Eighth and ninth steps in the method of fabrication can comprise the forming, by bending or folding for example, of the shoulder 22 (of FIG. 1) in the panel 16 into a generally L-shaped member, as can best be seen in FIGS. 1, 3, 4 and 5. The shoulder 22 is preferably spaced from the trailing edge 34 such that a portion of the panel 16 between the shoulder 22 and the trailing edge 34 defines the aft flange 24 which provides a mounting support for an axially adjacent panel 16.

In the eighth step, the panel 16 undergoes substantially simultaneous bending of approximately 90°, 180°, and 90°, respectively, about three spaced lines *65a*, *65b* and *65c*, respectively, (shown as dashed lines in FIG. 2), all being spaced from and parallel to the trailing edge 34 of the panel 16. An intermediate form of the shoulder 22 formed thereby, (FIG. 3), extends substantially perpendicularly from the first surface 56 and comprises substantially abutting, transversely extending, folded sections 66 and 68 of the panel 16. Preferably, an apex 70, the 180° bend, of the shoulder 22, which integrally joins the outer ends of the folded sections 66 and 68, is aligned with the centers of the holes 44, which holes 44 are folded about a centerline, as represented by the line *65b*, disposed perpendicularly to the major axis 46 thereof.

Typically in the prior art, the inner bend radius $R_1$ (FIG. 3), of the 180° bend, such as in the apex 70, must be greater than or equal to approximately 1.5 to 2.0 times the plate thickness T to avoid fracturing the apex 70 during the forming process. However, it has been determined that, in the present invention, a radius $R_1$, of much less than 1.5 to 2.0T can be formed and thereby allow the full length of sections 66 and 68 to abut and result in the apex 70 having a suitably small radius $R_1$ approaching zero in magnitude. Accordingly, the lateral width of the apex 70 is approximately 2T, which most nearly duplicates the contours of the prior art cast panel. Duplicating these contours, allows a fabricated panel 16 to be interchangeable with a cast panel in the structural frame 20.

At an end opposite to the apex 70, (FIG. 3), of the shoulder 22, folded sections 66 and 68 define a partial opening 71 therebetween. The opening 71 is formed inasmuch as the panel 16 is folded and the second surface 64 thereof extends to the apex 70 between sections 66 and 68, thereby defining abutting surfaces of the folded sections 66 and 68.

One example of a specific method for forming the shoulder 22 comprises the forming of the sections 66 and 68 into an inverted V-shape utilizing a die and then forcing, or coining, the sections together until they substantially abut. Preferably, and as can be seen in FIG. 1, the shoulder 22 is formed for facing away from the combustion zone 12 when a plurality of panels 16 are joined together to define the liners 14 of the combustor 10.

The ninth step in the method of fabrication, resulting in the structure shown in FIG. 4, comprises bending the outer portion of the shoulder 22 (about the dashed line *65d* shown in FIG. 3) into a lip 72. The lip 72 extends substantially perpendicularly from an outer end of a base portion 73 of the shoulder 22 and preferably toward the leading edge 32 of the panel 16. The base portion 73 and the lip 72 comprise the shoulder 22 and generally define an L-shape shoulder 22 which thus is shaped to fit the slot 26 in the structural frame 20, shown in FIG. 1.

More specifically, the approximately 90° bend between the base portion 73 and the lip 72 of the shoulder 22 has an inner bend radius $R_2$, which according to the prior art should be greater than or equal to approximately 1.5 to 2.0T. However, a radius $R_2$ of approximately zero magnitude has been provided. Such a sharp radius $R_2$ is preferred in order that the shoulder 72 properly fit into the slot 26. Additionally, the base portion 73 of the shoulder 22 can abut an end of a ledge portion of the slot 26 (FIG. 1) on which the lip 72 rests to most effectively utilize the limited space in the slot 26.

As shown in FIG. 4, the shoulder 22 comprises a plurality of L-shaped portions spaced by the holes 44. More specifically, the shoulder 22 now defines a structure having a plurality of holes 44, which in FIG. 4 can be alternatively described as notches, which divide the lip 72 into a plurality of lip portions *72a* and which also divide the outer end of the base portion 73 of the shoulder 22 into a plurality of base portions *73a*. The holes 44 are effective for allowing cooling air to pass therethrough and for accommodating thermally induced, circumferential dimensional changes of the shoulder 22 which can occur in the combustor environment.

A tenth step in the method of fabrication comprises providing, such as by drilling, a plurality of cooling holes 74 (FIG. 4) through the panel 16, preferably spaced from and parallel to the front flange 28. Alternatively, the cooling holes 74 could be formed by perforation during the second step as above described.

As can be seen in FIG. 1, which shows axially adjacent panels 16, the shape of the front flange 28 is effective for spacing the second surface 64 of one panel 16 from the aft flange 24 of the adjacent panel 16 on which the front flange 28 rests. This allows the cooling holes 74 to direct a flow of cooling air to impinge upon the aft flange 24 of an adjacent panel 16 to cool the aft flange 24. The impinging cooling air can then flow along the second surface 64 of the panel 16 to film cool the surface. Thus, the front and aft flanges 28 and 24, respectively, and the cooling holes 74 cooperate to provide means for cooling the aft flange 24 of one panel and the second surface 64 of a panel adjacent thereto.

When a panel 16 includes a dilution hole 48 as is shown in FIG. 1, the method of fabrication can include an eleventh step of attaching the tubular dilution eyelet 50 to the panel 16 through the dilution hole 48. The dilution eyelet 50 can be attached to the panel 16 by bonding, brazing, welding, activated diffusion bonding, or any other suitable method. The dilution eyelet 50 thereby preferably becomes integral with the panel 16.

An integral dilution eyelet 50 is an improvement over those embodiments in which the dilution eyelet 50 is supported by and extends through the structural frame 20 and the dilution hole 48 of the panel 16. Such an arrangement required the removal of the eyelets 50 prior to the removal of a panel 16. Furthermore, assembly stack-up tolerances and thermal growth mismatch between the eyelet 50 and the panel 16 through which it was suspended were present. Accordingly, a panel 16 including an integral eyelet 50 spaced from and aligned with the hole 52, results in an improved, compact and lightweight panel 16, and alignment and interference problems between the panel 16 and the structural frame 20 are thereby substantially eliminated.

A twelfth step in the method of fabrication can comprise forming the panel 16 to a preselected curve about the longitudinal centerline 36, as illustrated in FIG. 5. The twelfth step is preferably performed simultaneously with the ninth step so that the lip portions 72*a* (FIG. 4) are more easily made arcuate. Preferably, the panel 16 is formed to an arc, the arc having a radius $R_3$ extending from the longitudinal axis 37 and being substantially equal in magnitude to a radius $R_4$ or $R_5$ of the liner 14*a* or 14*b*, respectively, of the combustor 10, shown in FIG. 1.

Of course, the fabricated panel 16 as illustrated in FIG. 5 is an embodiment for use for forming combustor liner 14*a* of FIG. 1. However, and as evident in FIG. 1, a suitable panel 16 for liner 14*b* requires an appropriate curve thereto, i.e. $R_3 = -R_5$, so that the second surface 64 is convex. Furthermore, it is to be appreciated that each panel 16 can be frusto-conical and, accordingly, the radius of curvature $R_3$ is suitably varied from the front flange 28 to the aft flange 24.

When the combustor 10 is annular, as is the one shown in FIG. 1, the second surface 64 of the panel 16 which faces the combustion zone 12 will be concave on the radially outer set of panels 16 of liner 14*a*, and convex on the radially inner set of panels 16 of liner 14*b*.

Returning to FIG. 5, a thirteenth step of fabrication comprises inserting filler material, such as filler wire, between the sections 66 and 68 of the panel 16 comprising the shoulder 22 and the lip 72 thereof and bonding the sections 66 and 68 together. Any appropriate bonding method can be employed such as, for example, activated diffusion bonding, brazing, or welding. Such bonding increases the durability and strength of the panel 16 and particularly of the shoulder 22 and the lip 72 thereof. The bonding also fills in the opening 71 at the base of the shoulder 22 to provide an aerodynamically smooth second surface 64. Additionally, it may be desired to bond, in a similar manner, the front flange 28 to the first surface 56 of the forward row panel 16 embodiment as shown in FIG. 1.

It is desirable that the sheet metal from which the panels 16 are fabricated meet certain criteria. More specifically and inasmuch as the panels 16 may be used as a combustor liner, the sheet metal material must be capable of withstanding the relatively high temperatures encountered in the combustor 10. Also, because the sheet metal will undergo forming operations, it preferably should have a suitably high ductility, as measured by an elongation of approximately 10% to 20%, for example.

Examples of typical high temperature superalloys having suitable ductility which are commercially available in sheet metal form and which are suitable as materials from which the panels 16 can be fabricated are the following:

(a) an alloy commercially known as Hastelloy X having a nominal composition in weight percent of about 21.8 Cr, 18.5 Fe, 9.0 Mo, 1.5 Co, 1.0 Mn, 1.0 Si, 0.6 W, 0.1 C, with the balance Ni; and (b) an alloy commercially known as HS-188 having a nominal composition in weight percent of about 22.0 Cr, 22.0 Ni, 15.5 W, 3.5 Fe, 1.25 Mn, 0.4 Si, 0.1 C, with the balance Co.

Of course, numerous other materials could also be employed in the fabrication of the panels 16 and the above-described nickel-based and cobalt-based superalloy materials, respectively, are presented as examples only. It is also preferable that the sheet metal stock have a thickness, T, of between 0.38 and 1.52 millimeters (0.015 and 0.060 inches), approximately, with 0.81 millimeters (0.032 inches) being preferred. For the particular application of the panels as combustor liners, such a thickness range provides the proper combination of strength and weight.

Furthermore, if desired, the fabrication can include a fourteenth step of coating at least the second surface 64, that is, the surface of the panel facing the combustion zone 12, with a thermal barrier coating, e.g., yttria stabilized zirconia.

The above-described forming, punching, notching, perforating, dimpling and bending operations can be performed in a shorter time and using less sophisticated and less costly machinery than that used in a casting process and thus the cost of the panels 16 is substantially reduced.

It is to be understood that this invention is not limited to the particular forms disclosed and it is intended to cover all modifications coming within the true spirit and scope of this invention as claimed. For example, as can be seen in FIG. 1, the shapes of some of the panels 16 may vary depending upon their relative positions in the liner 14. Correspondingly, the steps in the method of fabrication of this invention may have to be altered somewhat to accommodate such shape changes.

Additionally, the order in which the steps of the method of fabrication have been presented is not intended to be limiting and such steps may be rearranged as desired. The method of fabrication is not limited to fabricating combustor liner panels but also can be used for fabricating similar panels having one or more L-shaped shoulders for any appropriate flow confining application such as are found in gas turbine engines. Likewise, other similar modifications may occur to those skilled in the art and are intended to be covered by the claims of the present invention.

Having thus described the invention, what is claimed as patentably novel and desired to be secured by Letters Patent of the United States is the following.

What is claimed is:

1. A fabricated sheet metal panel comprising:

a plate member having first and second oppositely facing surfaces bounded by a leading edge, a trailing edge and first and second opposing side edges;

said plate member further comprising an integral shoulder spaced from and extending substantially parallel to said trailing edge thereof;

said shoulder comprising substantially abutting, folded sections of said plate member and including a base extending from said first surface and a lip extending from an outer end of said base portion, said folded sections having abutting surfaces which comprise portions of said second surface of said plate member.

2. The panel according to claim 1 further comprising a front flange extending substantially perpendicularly from said second surface of said plate member adjacent said leading edge thereof.

3. The panel according to claim 2 further comprising a plurality of cooling holes disposed in said plate member and being spaced from said front flange and disposed along a line substantially parallel to said leading edge thereof.

4. The panel according to claim 1 further comprising a plurality of depressions disposed in said first surface of said plate member and being spaced from and extending along a line substantially parallel to said leading edge thereof.

5. The panel according to claim 1 wherein said shoulder further comprises a plurality of spaced notches therein which divide said lip into a plurality of lip portions and which divide said outer end of said base portion into a plurality of base portions, said base portions extending substantially perpendicularly from said first surface and said lip portions extending toward said leading edge of said plate member.

6. The panel according to claim 1 wherein said plate member is frusto-conical and said second surface is concave.

7. The panel according to claim 1 wherein said plate member further comprises a circular hole disposed near the center thereof and a tubular member fixedly secured thereto and aligned in said circular hole.

* * * * *